United States Patent
Marty et al.

(10) Patent No.: US 9,563,588 B1
(45) Date of Patent: Feb. 7, 2017

(54) OS BYPASS INTER-PROCESSOR INTERRUPT DELIVERY MECHANISM

(71) Applicant: Google Inc., Mountain View, CA (US)

(72) Inventors: Michael Roger Marty, Madison, WI (US); Joel Scherpelz, Madison, WI (US)

(73) Assignee: Google Inc., Mountain View, CA (US)

( * ) Notice: Subject to any disclaimer, the term of this patent is extended or adjusted under 35 U.S.C. 154(b) by 326 days.

(21) Appl. No.: 14/208,644

(22) Filed: Mar. 13, 2014

Related U.S. Application Data (60) Provisional application No. 61/933,080, filed on Jan. 29, 2014.

(51) Int. Cl.
| | | |
|---|---|---|
| *G06F 13/32* | (2006.01) | |
| *G06F 9/52* | (2006.01) | |
| *G06F 9/50* | (2006.01) | |
| *G06F 9/54* | (2006.01) | |
| *G06F 9/48* | (2006.01) | |
| *G06F 13/24* | (2006.01) | |

(52) U.S. Cl.
CPC ............ *G06F 13/32* (2013.01); *G06F 9/4812* (2013.01); *G06F 9/4843* (2013.01); *G06F 9/5005* (2013.01); *G06F 9/52* (2013.01); *G06F 9/54* (2013.01); *G06F 13/24* (2013.01); *G06F 2213/2418* (2013.01)

(58) Field of Classification Search
CPC .... G06F 9/4812; G06F 9/4843; G06F 9/5005; G06F 9/52; G06F 9/54; G06F 13/24; G06F 13/32; G06F 2213/2418
See application file for complete search history.

(56) References Cited

U.S. PATENT DOCUMENTS

| | | | |
|---|---|---|---|
| 5,721,931 A | 2/1998 | Gephardt et al. | |
| 5,848,279 A | 12/1998 | Wu et al. | |
| 8,285,904 B2 | 10/2012 | Strauss et al. | |
| 8,612,659 B1 * | 12/2013 | Serebrin | ................. G06F 13/24 |
| | | | 710/262 |
| 2004/0117532 A1 | 6/2004 | Bennett et al. | |
| 2007/0157197 A1* | 7/2007 | Neiger | ................ G06F 9/45533 |
| | | | 718/1 |

(Continued)

FOREIGN PATENT DOCUMENTS

WO   2005104475 A2   11/2005

*Primary Examiner* — Glenn A Auve
(74) *Attorney, Agent, or Firm* — McDermott Will & Emery LLP (57) ABSTRACT

The present disclosure provides methods and systems to allow user space applications running on different cores to efficiently communicate interrupts between each other without have to enter an OS kernel. In one aspect, a hardware device for delivering inter-processor interrupts is provided. The hardware device includes a memory having a memory space that corresponds to a virtual memory space of a first guest process and a controller coupled to the memory. The controller may be configured to detect when interrupt information is recorded in the memory space. In that regard, the interrupt information is directed to a second guest process associated with a particular CPU core. In response to detecting interrupt information recorded in the memory space, the controller is configured to cause the second guest process to run on a different CPU core without making an operating system call.

20 Claims, 5 Drawing Sheets

(56) References Cited

U.S. PATENT DOCUMENTS

| | | | | |
|---|---|---|---|---|
| 2010/0274940 A1* | 10/2010 | Ahmad | ................ | G06F 9/4812 710/267 |
| 2013/0054861 A1* | 2/2013 | Tsirkin | ................... | G06F 13/24 710/266 |
| 2013/0159579 A1* | 6/2013 | Neiger | ................ | G06F 9/30076 710/265 |

* cited by examiner

OS BYPASS INTER-PROCESSOR INTERRUPT DELIVERY MECHANISM

CROSS-REFERENCE TO RELATED APPLICATIONS

The present application claims the benefit of the filing date of U.S. Provisional Patent Application No. 61/933,080 filed Jan. 29, 2014, the disclosure of which is hereby incorporated herein by reference.

BACKGROUND

To enable better utilization and time-sharing of processor cores, application threads generally relinquish a core when they have no more work to process. In some situations, the kernel scheduler reschedules these threads onto a core when they have additional work to process. For example, another application thread may produce some work, and, therefore, may provide a notification to the kernel scheduler that a blocked thread should be rescheduled onto a different core for processing the work.

One procedure for providing this type of notification would be to invoke the operating system (OS) kernel through a blocking IO system call, which would write to a pipe causing the OS kernel to reschedule a process onto some other core. It does this by invoking some scheduling code and sending instructions to the other core, which would then cause the processors of that core to start running the notified process. When the IO activity has completed, the OS kernel typically returns from the blocking system call.

Some highly tuned applications may wish to provide notification/rescheduling to another application thread without affecting its own critical path. For instance, a highly tuned packet processing application may wish to deliver the notifications to the kernel scheduler as cheaply as possible such that the packet processing pipeline is not disrupted by a costly system call. In some instances, these notification messages can be written to a special address that can cause an interrupt based on the special address. However, in these cases the writes are only accepted from trusted peripheral devices and privileged applications.

BRIEF SUMMARY

Aspects of the present disclosure advantageously provide techniques for allowing privileged and unprivileged user space applications to write information directly to a hardware device that then generates interrupts for some other application without invoking an operating system call. For example, the information may indicate that the other application should be scheduled to start running on a different processor core. One aspect of the present disclosure provides a hardware device for delivering inter-processor interrupts. The hardware device includes a memory that has a memory space mapped to a virtual memory space of a first guest process. A controller is coupled to the memory. The controller is configured to detect when interrupt information is recorded in the memory space. The interrupt information is directed to a second guest process associated with a particular CPU core. In response to detecting when the interrupt information is recorded in the memory space, the controller is configured to generate an interrupt based on the interrupt information that causes the second guest process to run on a different CPU core without making an operating system call.

Another aspect of the present disclosure provides a system for delivering inter-processor interrupts. The system includes one or more CPU cores and a hardware device in communication with the one or more CPU cores. The hardware device includes a memory storing a number of context registers and one or more processors coupled to the memory. Each context register is mapped to an address associated with a particular guest process from a plurality of guest processes executing on the system. The one or more processors are configured to detect when interrupt information is recorded in a given context register associated with a first guest process of the plurality of guess processes. The interrupt information is directed to a second guess process associated with a particular core of the one or more CPU cores. In response to detecting the recorded interrupt information in the context register, the one or more processors are configured to generate an interrupt based on the interrupt information that causes the second guest process to run on a different CPU core without making an operating system call.

Yet another aspect of the present disclosure provides a method for delivering inter-processor interrupts. The method includes using one or more processors to receive interrupt information at a memory space of a hardware device. The memory space is associated with a first guest application. A second guest application associated with a particular CPU core is identified based on the interrupt information. The interrupt information includes an identifier representing a location associated with the second guest process. In response to identifying the second guest application, an interrupt directed at the second guest application is generated. The interrupt causes the second guest process to run on a different CPU core without making an operating system call.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure relates generally to providing a hardware device that allows a user space application to send an interrupt without entering an OS kernel. The interrupt may cause another user space application to starting running on a different core. In some situations, a process and/or application may be designed to execute in a user space running on a core dedicated for a specific purpose. At some point, the process may need to notify another process that it should be rescheduled onto some other core because, for example, the current core will be busy for a period of time.

In one aspect, a number of physical address spaces or context registers are allocated from memory of the hardware device. The context registers are prearranged as a unidirectional communication mechanism from the user space applications to the hardware device. For example, each register is mapped to a virtual address space associated with a particular user space application. Each memory mapped user space application can directly interact with the hardware device by writing information to the context registers.

The hardware device as described herein can detect when a user space application has written information to the context registers. This information includes interrupt information directed at another user space application associated with a processor core. In response to detecting this information in a particular register, an interrupt is generated by the hardware device. In some instances, the interrupt causes another user space application to initiate activity on some other processor core of the system without making an operating system call.

Figure 1:
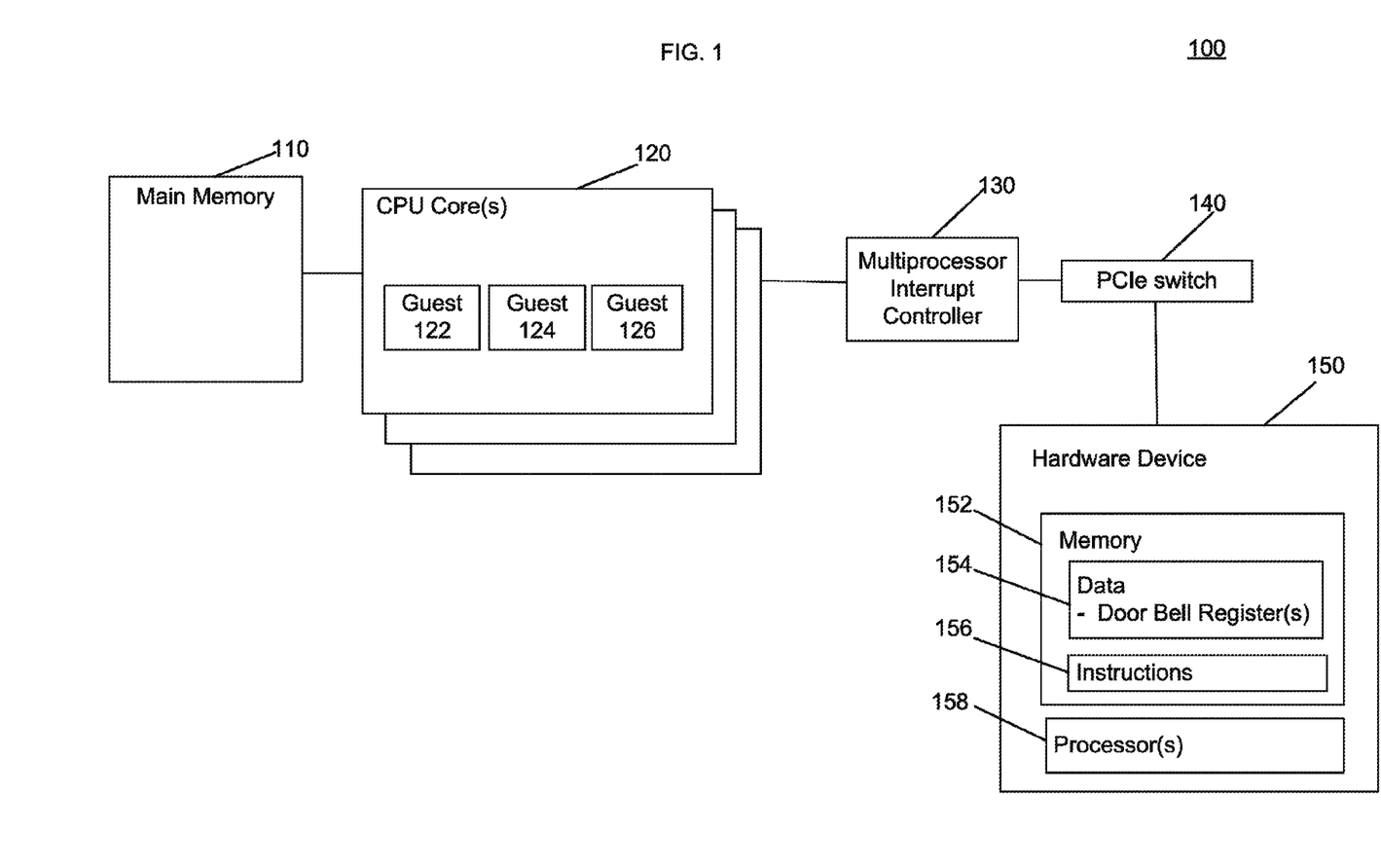
FIG. 1 is an example of a system in accordance with aspects of the present disclosure.

FIG. 1 is an example of a system 100 in accordance with aspects of the disclosure. The system 100 may be, for example, a computing system of certain computing devices interconnected on a motherboard. Such a system may be present in datacenters or other computing environments. The computer system 100 includes main memory 110 coupled to one or more central processing unit (CPU) cores 120. The CPU cores 120 are further coupled to a multiprocessor interrupt controller 130, such as an advanced programmable interrupt controller (APIC), which is capable of delivering interrupts to each CPU core.

The main memory 110 of system 100 is accessible by the CPU cores 120, and may store data and instructions executable by the cores. The memory 110 also includes data that can be retrieved, manipulated or stored by the cores. The memory can be of any non-transitory type capable of storing information accessible by the processor, such as a hard-drive, memory card, ROM, RAM, DVD, CD-ROM, write-capable, and read-only memories.

The CPU cores 120 are connected to and communicate with the main memory 110 by, for example, a data bus and an address bus. The CPU cores 120 may each include a microprocessor residing on a chip, a multi-core processor, etc. Alternatively, each CPU core can be a dedicated component such as an application-specific integrated circuit ("ASIC") or other hardware-based processor. While only a few CPU cores are shown, system 100 may include any number of cores.

The system 100 may include a number of guest applications running on the CPU cores 120. For example, guests 122-126 may be some set of code (e.g., user space application) or other processes executing on the CPU cores 120. In some aspects, each guest application may include code that executes in a privileged mode thereby allowing it direct access to hardware and memory in the system 100. In other aspects, each guest application may include code that executes in an unprivileged mode, and, therefore, does not expect to have full control over system 100. Typically, the CPU cores 120 only allow trusted code, such as kernel code, to access the cores directly. System 100 enforces this, for example, by ensuring that the CPU cores 120 will not execute certain instructions unless the current privilege level for the process sending the instructions is at a high enough level.

To control the CPU cores 120, system 100 includes a multiprocessor interrupt controller 130, such as an APIC. The controller 130 can sends signals, e.g., instructions, for each CPU core to execute. For example, these instructions may include interrupt requests that were sent to the controller 130 from some other component of system 100. By being able to deliver interrupts to each CPU core, system 100 is able to fully exploit the CPU cores ability to work cooperatively and in parallel. In some embodiments, the controller 130 may include an internal clock, a local timing device and other hardware and software devices for communicating with the CPU cores 120 and for communicating with other components of system 100.

While the computer system 100 may be described as a system of devices on a motherboard, the computer system 100 may be any configuration of electronically coupled computing devices. For example, the system 100 may include a backplane interconnecting peripherals, an expansion card interface, or the like. As another example, the connection between the computing devices may be hard-wired connections, wireless connections, or any other type of connections. As yet another example, the computer system 100 may include TCP/IP, 802.33, Ethernet, InfiniBand, or any other type of communication network.

As noted above, system 100 may ensure that the CPU cores 120 only execute certain instructions. For example, the multiprocessor interrupt controller 130 may be configured to only acknowledge interrupt instructions received from components of system 100 running in privileged mode. However, in some situation, a guest application not running in privileged mode may need to execute a CPU interrupt in order to signal another application to run on at least one of the CPU cores 120. Moreover, the guest application may want to send this signal without interrupting its own critical path, for example, by blocking its own processing in order to make an operating system call to invoke the interrupt. In this regard, system 100 includes a hardware device 150 that is configured to facilitate this type of inter-processor interrupt communication.

For the hardware device 150 to communicate with system 100, the device may be connected to a multiprocessor interconnect 140, such as a peripheral interconnect card express (PCIe) switch. The PCIe switch can be a high speed interconnect chip that provides for an interconnection of one or more system devices to other components in the computer system 100. The interconnect 140 may also be a motherboard-level interconnecting device, an expansion card interface, or the like. Other system devices including hardware device 150 may communicate with each other through the interconnect 140 over one or more links. For example, the hardware device 150 as described herein may communicate with the APIC 130 via the interconnect 140 in order to generate interrupts. Although FIG. 1 functionally illustrates the interconnect 140 and the hardware device 150 as being in separate blocks, the interconnect 140 and the hardware device 150 may actually be within a single block, such as integrated into a processor itself.

As shown in this example, the hardware device 150 includes its own memory 152. This memory 152 may also store instructions 156 and data 154 that are accessible by one or more processors 158. The processors 158 may execute the instructions 156 and access the data 154 to control the operations of the hardware device 150.

The processors 158 may be suitable processors, such as any of the various processors discussed above. Although FIG. 1 functionally illustrates the processor 158 and memory 152 as being within a single block, the processor 158 and memory 152 may actually comprise multiple processors and memories that may or may not be stored within the same physical housing. Accordingly, references to a processor, computer or memory may include references to a collection of processors or memories that may or may not operate in parallel.

The memory 152 may be a type of tangible, non-transitory memory operative to store information accessible by the processor 158, including any of the memories discussed above. The subject matter of the present disclosure may include different combinations of the foregoing, whereby different portions of the instructions 156 and data 154 are stored on different types of media.

The instructions 156 may be a set of instructions to be executed directly (such as machine code) or indirectly (such as scripts) by the processor 158. For example, the instructions 156 may be stored as computer code (e.g., software program) on a computer-readable medium. In that regard, the terms "instructions" and "programs" may be used interchangeably herein. The instructions 156 may be stored in object code format for direct processing by the processor 158, or in other computer language including scripts or collections of independent source code modules that are interpreted on demand or compiled in advance. Functions, methods and routines of the instructions are explained in more detail below.

The data 154 can be retrieved, stored or modified by the processor(s) 158 in accordance with the instructions 156. For instance, although the hardware device 150 is not limited by a particular data structure, the data 154 can be stored in computer registers, in a relational database as a table having a plurality of different fields and records, or XML documents. The data 154 can also be formatted in a computer-readable format such as, but not limited to, binary values, ASCII or Unicode. Moreover, the data 154 can include information sufficient to identify relevant information, such as numbers, measurements, descriptive text, proprietary codes, pointers, and references to data stored in other memories, including information that is used by a function to memory address of relevant data.

In order to facilitate the operations the hardware device 150 for delivering interrupts, the device may further include a mechanism that allows one guest application to send interrupts to another guest application. As discussed above, this mechanism may be referred to as a context register. A user space application can use the context registers to specifying which other application will receive the interrupt. For instance, the memory 152 of hardware device 150 may include a number of context registers where each register includes an identifier that is used to specify a particular guess application to receive an interrupt. Additional aspects of these context registers are further discussed below.

Figure 2:
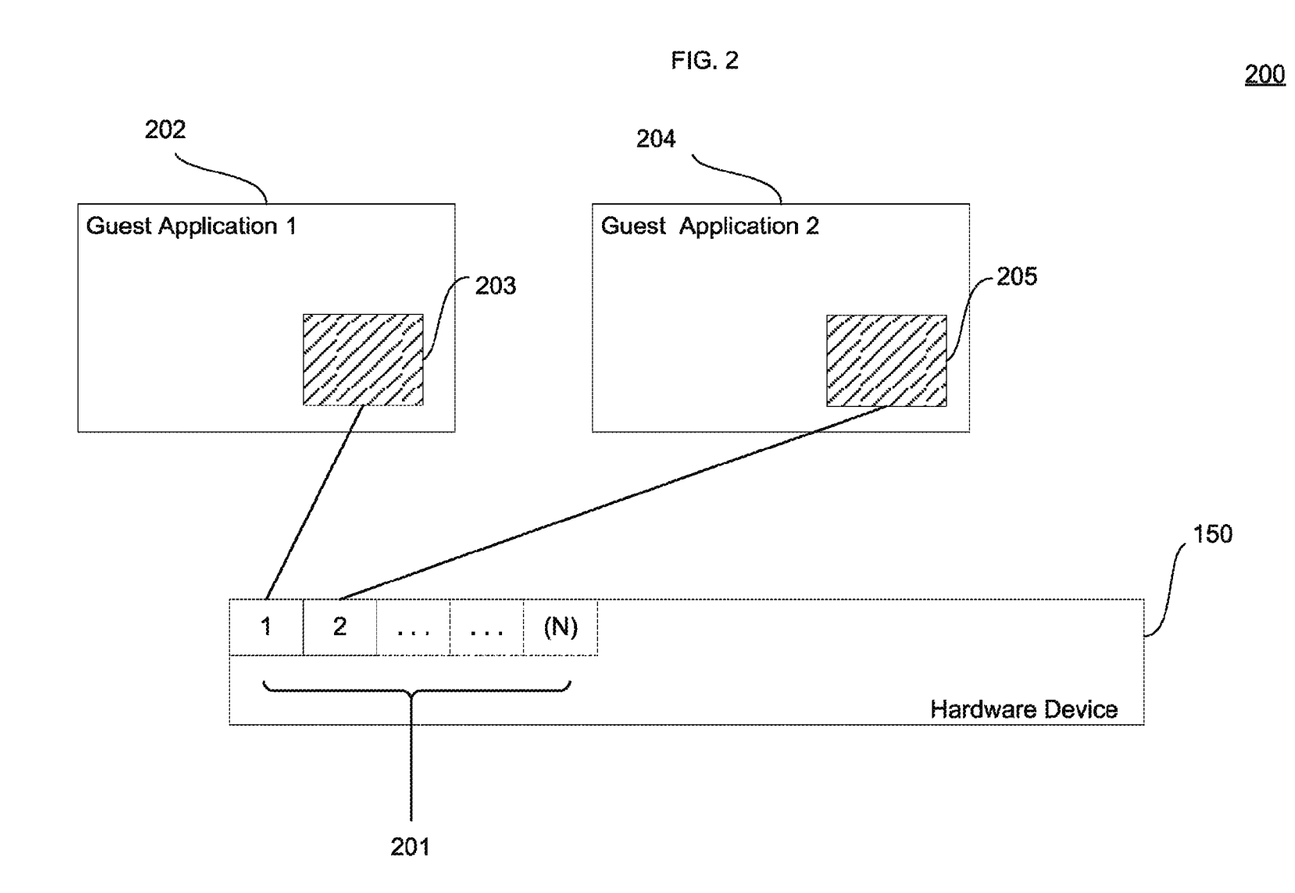
FIG. 2 is a block diagram the hardware device of FIG. 1 in accordance with aspects of the present disclosure.

In FIG. 2, an example block diagram of the hardware device 150 of FIG. 1 is shown. As shown, the hardware device 150 includes a number of context registers 201 mapped to a plurality, here two, of guest applications. For example, guest applications 202 and 204 are mapped to a corresponding context register in the memory of the hardware device 150. The hardware device 150 is configured to provide these context registers, which are allocated to the applications, for example, by a kernel device driver associated with the device.

Memory mapping is used to map each context registers of hardware device 150 to a virtual address of the guest applications 202 and 204. For example, each guest application has its own virtual address space. As shown in FIG. 2, the guest application 202 includes virtual address space 203 while the guest application 204 includes virtual address space 205. These virtual address spaces are completely separate from each other so that a process running on one guest application cannot affect another.

In some aspects, the guest applications are able to send interrupts by using the context registers 201. In this regard, each context register is associated with a physical address. For example, the context registers 201 of hardware device 150 are associated with a specific physically space in the memory of the device. These registers include certain information that allows one guest application to send interrupts. For example, guest application 203 can write information to a corresponding context register of the hardware device 150. The device 150 detects that this information has been written to the context register. For example, a processor associated with the hardware device 150 may detect whether information has been written to the one or more the context registers 201. The hardware device 150 is configured to then send an interrupt based on this information.

Figure 3:
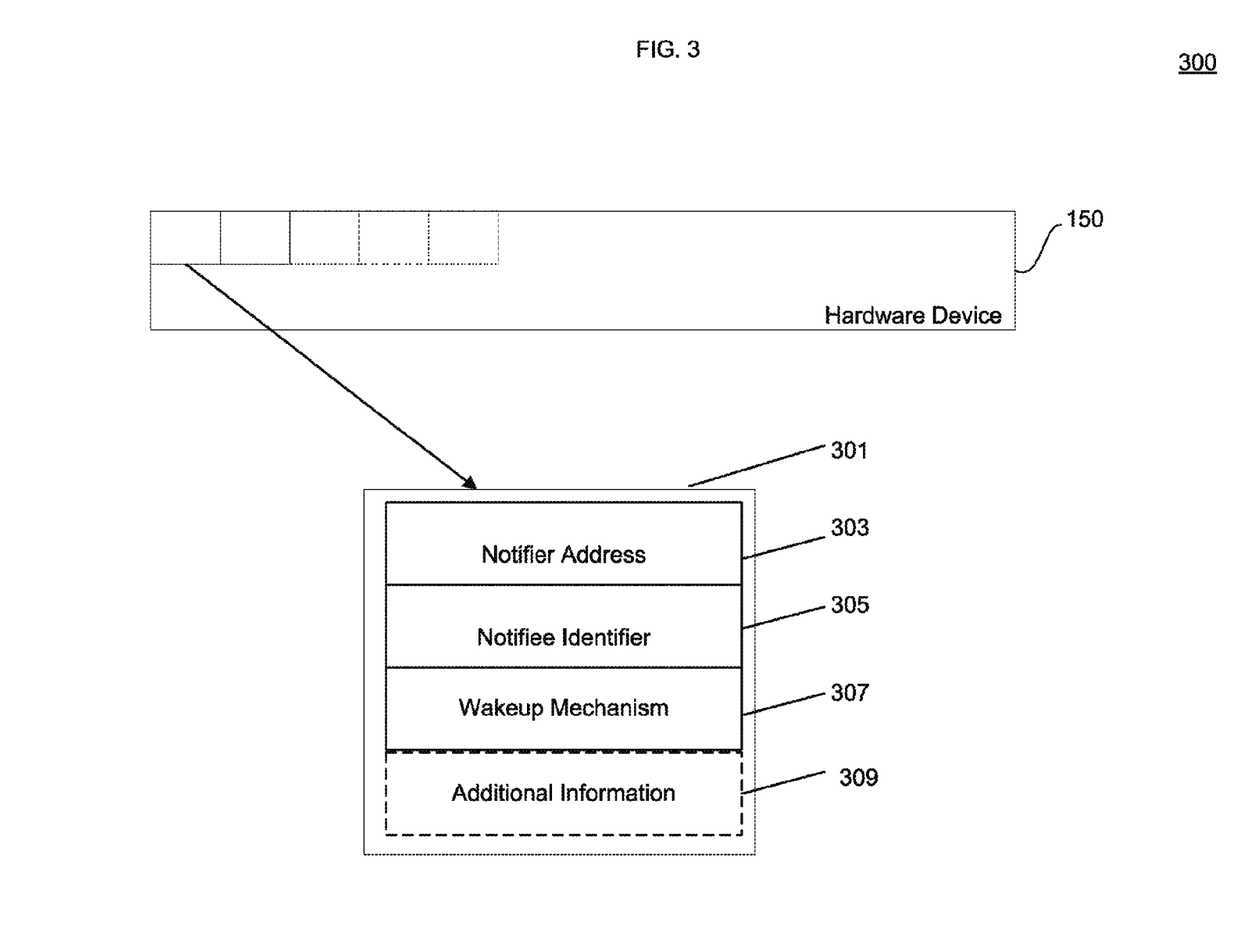
FIG. 3 is another view of the hardware device of FIG. 1 in accordance with aspects of the present disclosure.

With respect to FIG. 3, another view 300 of the hardware device 150 of FIG. 1 is shown. In this example, details regarding the information that can be written to the context registers are explained. For example, context register 301 may include a notifier address 303, a notifiee identifier 305, a wakeup mechanism 307 and a CPU core identifier 309.

The notifier address 303 may be memory mapped to a virtual address of a guest application that is associated with the context register 301. For example, context register 301 may be mapped to a particular guest application operating as a "notifier." The notifier will write information to its context register when it wants to arm the register for delivering an interrupt directed at another application. For example, this information indicates a particular application or "notifiee" that should be rescheduled onto some other CPU core. In some aspects, the notifier may use the CPU core identifier 309 to specify, for example, which CPU core number should receive the interrupt. Upon detecting that information has been written to the context register 301, the hardware device 105 will take some action, such triggering the interrupt.

To determine an intended target or notifiee of the interrupt, the context register 301 includes information to identify this target. For example, the context register 301 includes a notifiee identifier 305 that includes information indicating an identification of the target/notifiee application, such as the context register ID associated with this target application, and a key. The key may be something that the notifiee programs into its context register and advertises this to the notifiers. For example, at an initialization time of the hardware device 150, each guest application is allocated a context register and a key to prevent a malicious/buggy guest application from sending unauthorized notifications. These context register id/key pairs for each guest application may be communicated to all of the user space applications registered with the hardware device 150 by a side channel mechanism. For example, this side channel mechanism can be any existing interprocess communication mechanism that requires blocking I/O system calls like a socket or named pipe.

In order to enable the notifiee application to relinquish the CPU core and block in the kernel (until awoken by the notifier application), a "doorbell" or wakeup mechanism is provided. For example, the context register 301 may also include a wake mechanism 307 that has been allocated for each guest application associated with a given context register. With certain operating systems (e.g., Unix/Linux), this wakeup mechanism 307 may be a special file descriptor (similar to an eventfd call) that becomes readable when the hardware device 150 triggers an interrupt intended for the notifiee application. In other types of operating systems, the wakeup mechanism 307 may be some similar mechanism used by user space applications for blocking in the system.

To block in the kernel until rescheduled by a notifier application, the notifiee may perform certain steps. For example, the notifiee may first arm its context register for accepting interrupts. As discussed above, the context register may be armed for delivering interrupts by a notifier application writing directly to its corresponding register. Alternatively, a user application operating as a notifiee may arm its context register for accepting interrupts using the wakeup mechanism associated with its register. For example, the notifiee may block on the wakeup mechanism 307 (e.g., file descriptor) or use some other blocking OS resource. In this regard, the context register will be implicitly armed for accepting interrupts whenever the notifiee blocks on the wakeup mechanism 307. It will be disarmed whenever the notifiee is running to prevent interrupts from interrupting work it already has to do. For example, the context register may be disarmed when the notifiee application is performing other work rather than blocking on the wakeup mechanism 307. When the context register is armed, the notifiee application associated with the register may then block until awoken by a notifier application.

Figure 4:
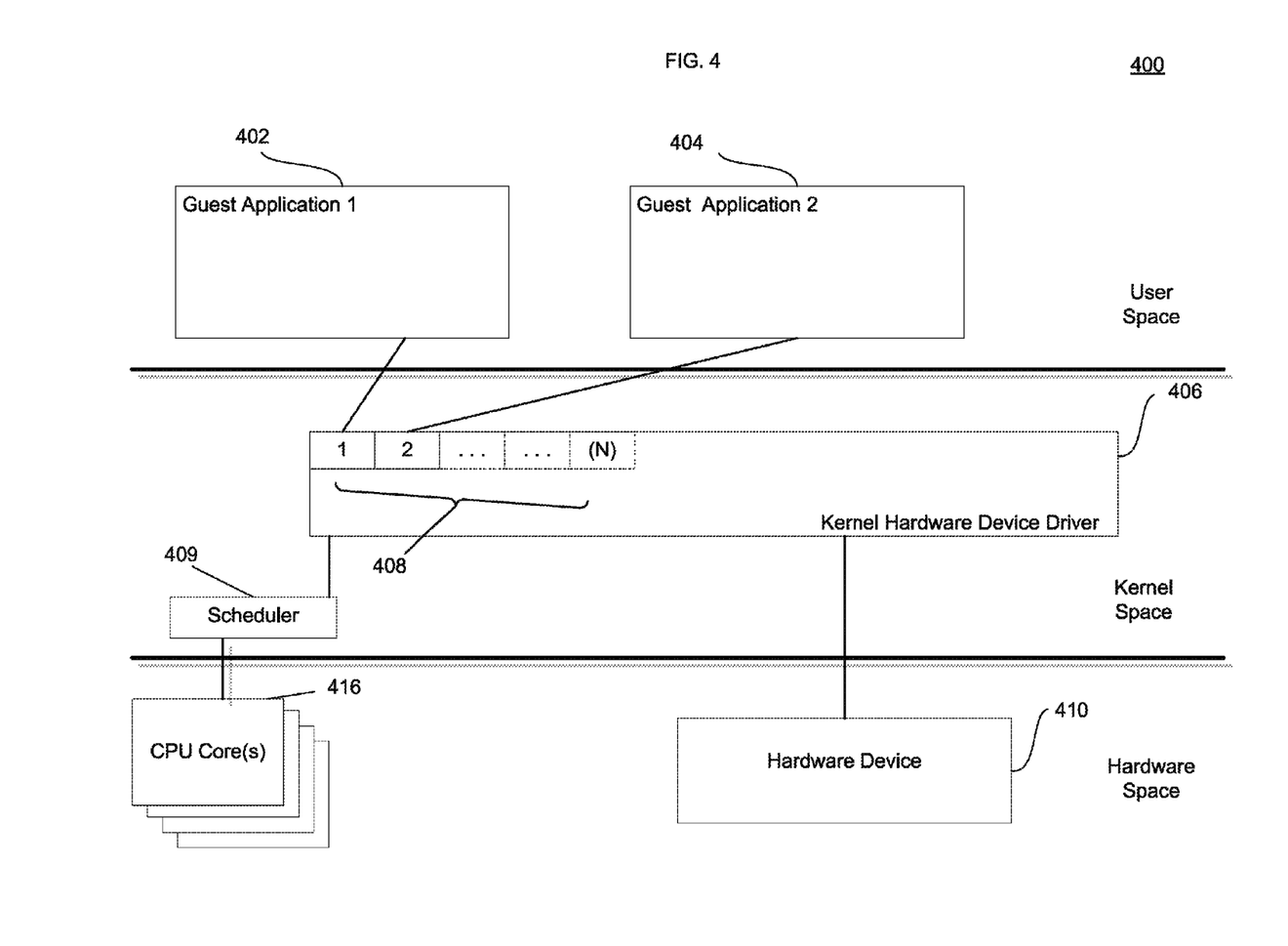
FIG. 4 is another example of a system in accordance with aspects of the present disclosure.

FIG. 4 is another example of a system 400, which may be used to deliver inter-processor interrupts. In this example, the system 400 has a plurality, here two, of guest applications. For example, guest applications 402 and 404 may be executed in a user space of the system 400. The user space refers to a code space allocated by the system 400 for user processes to run. The guest applications 402 and 404 may include code that executes in a privileged or an unprivileged mode.

System 400 includes an operating system, such a Unix/Linux, running in the kernel space. The kernel is the core of this operating system. It has full access to any memory, hardware or any other components of system 400. Typically, to invoke an interrupt, the guest applications 402 and 404 would have to make a kernel system call that may block the applications until the call is complete. Normally, only privileged mode code is able to cause interrupts. Here, system 400 is configured so that the guest applications running in the user space can cause interrupts without having to enter the OS kernel. For example, system 400 includes a hardware device 410 capable of generating these kinds of interrupts.

The hardware device 410 may be attached to a hardware space of system 400 via a peripheral interconnect mechanism like a PCIe switch (not shown). Alternatively, the hardware device 410 and the peripheral interconnect mechanism may be integrated together, such as on a processor. In some embodiments, the hardware device 410 may also be attached to a processor controller (not shown), such as an APIC, that is capable of delivering interrupts to one or more CPU cores 416.

A number of physical address spaces forming part of the hardware device 410 serve as context registers for the guest applications running on system 400. The registers contain certain information that allows one guest application to generate interrupts. For example, this information includes an identifier of the guest application that is a target of the interrupt, a key to prevent unauthorized notifications and a CPU core identifier to specify which CPU core should receive the interrupt. The hardware device 410 is configured to detect when this information is written to the doorbell registers. In response, an interrupt may be provided that causes another guest application to start some type of work on one of the CPU cores 416.

A kernel hardware device driver 406 associated with the hardware device 410 may register each guest application with a particular context register. For example, a virtual address associated with quest applications 402 and 404 may be memory map to a physical address of the hardware device 410. In some embodiments, the kernel hardware device driver 406 may store a reference 408 of the doorbell register mappings in order to be able to later determine which guest applications correspond to which context register of the hardware device 410.

According to aspects of the disclosure, the context registers allow one guest application to generate an interrupt for another quest application without having to use system calls. In some embodiments, the application that receives the interrupt may be rescheduled to perform some work on the one or more CPU cores 416. In order to reschedule the applications, a guess application may perfume a memory-mapped write directly to a particular context register of the hardware device 410 without OS intervention. An advantage of performing this type of write commend without involving the OS is that the guess application will not have to block itself in order to execute the command.

Once an indication of an interrupt has been written to the context registers, e.q., by a particular quest application or notifier, the hardware device 410 will then generate an interrupt to the operating system kernel. As part of serving the interrupt, the kernel device driver 406 may determine from its internal mapping 408 which particular notifiee is the target of the interrupt, and, subsequently, determine which application process to reschedule. The kernel device driver 406 may then invoke system kernel scheduler 409 so that target application may be scheduled to run/execute on at one of the CPU cores 416.

Techniques for generating interrupts, for example, using system 400, will now be described. As noted above, the following operations do not have to be performed in the precise order described below. Rather, as mentioned above, various operations can be handled in a different order or simultaneously, and operations may be added or omitted.

Figure 5:
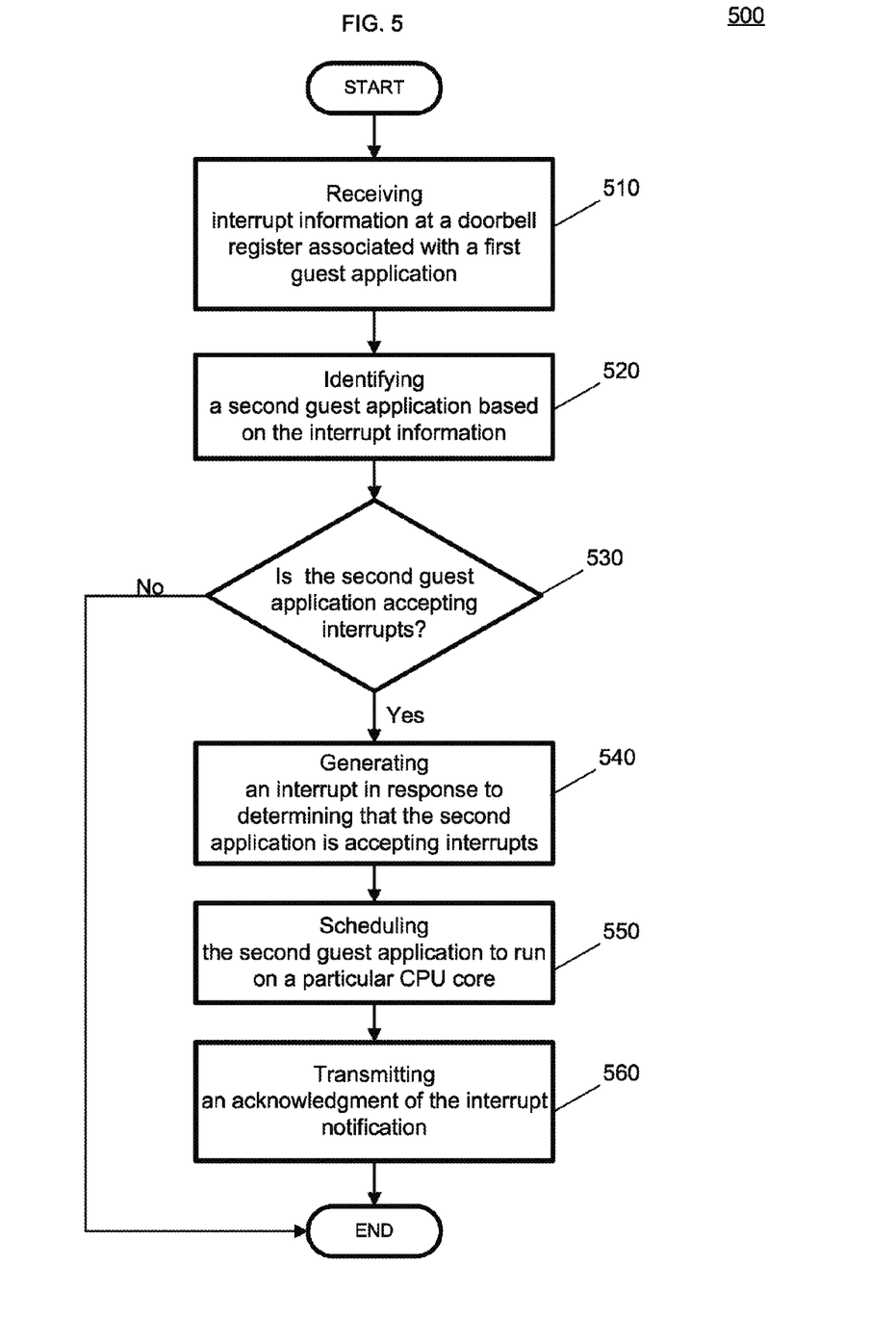
FIG. 5 is an example of a method in accordance with aspects of the present disclosure.

FIG. 5 is an example of a method 500, which may employ a hardware device as described herein. At block 510, interrupt information is received at a context register associated with a first guest application. The context register may be an allocated memory space in the hardware device. For example, the memory space may be memory mapped to a virtual address of the first guest application. The first guest application may write certain interrupt information to the context register.

At block 520, a second application is identified based on the interrupt information. For example, the hardware device may detect when the interrupt information is written to the context register. This interrupt information includes various fields, for example, the fields may include an identifier associated with a second guest application, a key to prevent unauthorized interrupt notifications and a CPU identifier of a CPU core to be interrupted.

At block 530, it is determined whether the second guest application is already performing work, and thus not accepting interrupts. For example, the second guest application (e.g., notifiee application) may arm a type of doorbell or wakeup mechanism that indicates whether the second guest application is accepting interrupts. Alternatively, the wakeup mechanism may be disarmed by the second guest application when it is performing other work. This may be done so that the other work currently being performed by the second application is not interrupted.

At block 540, an interrupt is generated. For example, when it is determined at block 530 that the second guest application is not already performing work, the hardware device may generate an interrupt to a standard multiprocessor interrupt controller, such as an APIC.

At block 550, the second guest application is scheduled to run on a different CPU core. For example, a kernel device driver associated with the hardware device may send a signal to a kernel scheduler so that the second guest application can be scheduled to start running on a particular CPU core, such as the CPU core specified in the interrupt information.

At block 560, an acknowledgment of the interrupt notification is transmitted. For example, the hardware device may receive a signal from the second guest application or some other component, such as the kernel scheduler, indicating that the application has been successful rescheduled.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A hardware device for delivering inter-processor interrupts, comprising:
   a memory having a memory space being mapped to a virtual memory space of a first guest process; and
   a controller coupled to the memory, the controller being configured to detect when interrupt information is recorded in the memory space, the interrupt information being directed to a second guest process associated with a particular CPU core;
   wherein in response to detecting that the interrupt information is recorded in the memory space, the controller is configured to generate an interrupt based on the interrupt information that causes the second guest process to run on a different CPU core without making an operating system call.

2. The hardware device of claim 1, wherein the interrupt information includes an identifier representing a location associated with the second guest process.

3. The hardware device of claim 1, wherein the interrupt information includes a CPU core identifier indicating the particular CPU core to receive the interrupt.

4. The hardware device of claim 1, wherein, to generate the interrupt, the controller is further configured to transmit the interrupt information to a scheduler in order to schedule the second guest process to run on the different CPU core.

5. The hardware device of claim 1, wherein the memory further includes a doorbell mechanism being configured to arm the controller for generating interrupts to the second guest process.

6. The hardware device of claim 5, wherein the second guest process is configured to disarm the doorbell mechanism so as not to be interrupted.

7. A system for delivering inter-processor interrupts, comprising:
   one or more CPU cores; and
   a hardware device in communication with the one or more CPU cores, the hardware device comprising:
      a memory storing a number of context registers, each context register being mapped to an address associated with a particular guest process from a plurality of guest processes executing on the system; and
      one or more processors coupled to the memory, the one or more processors being configured to detect when interrupt information is recorded in a given context register associated with a first guest process of the plurality of guess processes, the interrupt information being directed to a second guess process associated with a particular CPU core of the one or more CPU cores,
      wherein in response to detecting that the interrupt information is recorded in the given context register, the one or more processors are configured to generate an interrupt based on the interrupt information that causes the second guest process to run on a different CPU core of the one or more CPU cores without making an operating system call.

8. The system of claim 7, wherein the interrupt information includes an identifier representing a location associated with the second guest process.

9. The system of claim 7, wherein the interrupt information includes a CPU core identifier indicating the particular CPU core to receive the interrupt.

10. The system of claim 7, wherein to generate the interrupt, the one or more processors are further configured to transmit the interrupt information to a scheduler in order to schedule the second guest process to run the different CPU core.

11. The system of claim 7, wherein the memory further includes a doorbell mechanism being configured to arm the controller for generating interrupts a given guest process.

12. The system of claim 11, wherein the given guest process is configured to disarm the doorbell mechanism so as not to be interrupted.

13. A method for delivering inter-processor interrupts, comprising:
   receiving, using one or more processors, interrupt information at a memory space of a hardware device, the memory space being associated with a first guest process;
   identifying, using the one or more processors, a second guest process associated with a particular CPU core based on the interrupt information, the interrupt information including an identifier representing a location associated with the second guest process; and
   in response to identifying the second guest process, generating, using the one or more processors, an interrupt directed at the second guest process, the interrupt causing the second guest process to run on a different CPU core without making an operating system call.

14. The method of claim 13, wherein identifying the second guest process based on the interrupt information comprises detecting that the interrupt information is recorded in the memory space.

15. The method of claim 13, wherein the interrupt information includes a CPU core identifier indicating the particular CPU core to receive the interrupt.

16. The method of claim 13, wherein the memory space further includes a doorbell mechanism being configured to arm the one or more processors for generating interrupts to the second guest process.

17. The method of claim 16, further comprising:
  determining whether the doorbell mechanism is armed; and
  when it is determined that the doorbell mechanism is armed, transmitting the interrupt.

18. The method of claim 16, further comprising disarming the doorbell mechanism so that the second guest process is not to be interrupted.

19. The method of claim 18, wherein transmitting the interrupt comprises scheduling the second guest process to run on the different CPU core.

20. The method of claim 19, further comprising receiving an acknowledgement from the second guest process of the interrupt.

\* \* \* \* \*